INVENTOR
Karl Traub

BY
ATTYS.

INVENTOR
*Karl Traub*
BY *Hill & Hill*
ATTYS.

April 2, 1968  K. TRAUB  3,376,522
ELECTROMECHANICAL BAND FILTER WITH REACTIVE
BRIDGING MEANS FOR SHIFTING OR ADDING
ADDITIONAL ATTENUATION POLES
Filed Sept. 21, 1965  7 Sheets-Sheet 4

INVENTOR
Karl Traub
BY
ATTYS.

INVENTOR
Karl Traub
BY
ATTYS.

United States Patent Office 3,376,522
Patented Apr. 2, 1968

3,376,522
ELECTROMECHANICAL BAND FILTER WITH REACTIVE BRIDGING MEANS FOR SHIFTING OR ADDING ADDITIONAL ATTENUATION POLES
Karl Traub, Munich, Germany, assignor to Siemens Aktiengesellschaft, a corporation of Germany
Filed Sept. 21, 1965, Ser. No. 489,804
Claims priority, application Germany, Sept. 21, 1964, S 93,270
6 Claims. (Cl. 333—71)

ABSTRACT OF THE DISCLOSURE

An electromechanical band filter comprising several mechanically coupled resonators, at least the end resonators provided with electromechanical transducers for the transition from electrical to mechanical vibrations, the filter containing at least one element generating an attenuation pole in the filter blocking range, and at least one reactance bridging the element generating the attenuation pole, the reactance including at least the coupling of the element generating the attenuation pole to the adjacent resonators.

---

The invention relates to an electromechanical band filter which consists of several mechanically coupled resonators and in which at least the end resonators are provided with electromechanical transducers for the transition from electrical to mechanical vibrations.

In the construction of multi-element electromechanical band filters several mechanical resonators are so coupled, over coupling elements, that the mechanical oscillations excited in a resonator are transmitted to the next following resonator. The end resonators of such a filter are provided with electromechanical transducers which make possible the transition from electrical to mechanical oscillations or the transition from mechanical to electrical oscillations. As is well known, mechanical filters are distinguished from filters constructed with concentrated circuit elements, in particular, by their small spatial requirements and the high quality of the resonators. However, mechanical resonators, like resonators of highest frequency technology, present a structural unit determined by their geometric spatial form which has to be taken into account in the construction of the mechanical filter. For this reason, not all filter circuits producible by concentrated elements can be realized, without difficulty, with mechanical resonators. This circumstance is especially troublesome when filter circuits, generating attenuation poles in the blocking range of the filter, are to be realized by means of mechanical resonators.

In the endeavor to derive the advantages of steep attenuation poles in mechanical filters, there have become known or been proposed a number of mechanical filters with which attenuation poles can be generated. Frequently, however, the requirements on the filter, with respect to its attenuation characteristics, are directed to the feature that the distances of the attenuation poles from the pass range of the filter should be relatively small, that is, a very strong steepening of one or both blocking attenuation flanks must be achieved. As investigations basic to the invention have shown, in the attempt to realize such requirements, there arises, in particular, construction difficulties inasmuch as the dimensions of the coupling elements generally take on unfavorable values with respect to manufacturing techniques and mechanical stability of the filter.

The invention has as its problem to meet the above mentioned difficulties through relatively simple means, and further to simultaneously increase the number of the attenuation poles generated by a mechanical filter, or to shift the frequency of attenuation poles already present.

Proceeding from an electromechanical band filter which consists of several mechanically coupled resonators, in which at least the end resonators are provided with electromechanical transducers for the transition from electrical to mechanical oscillations, this problem is solved according to the invention by the feature that the filter contains at least one element generating an attenuation pole in the filter blocking range, which element is bridged by at least one reactance, and that the bridging includes at least the coupling of the element generating the attenuation pole to the next following resonators.

It is advantageous if the bridging includes at least one of the resonators, adjacent to the element generating the attenuation pole, and its coupling facing away from the pole generating element.

For the bridging reactance concentrated (lumped) circuit elements, such as, for example, coils or capacitors, or mechanical coupling elements can be utilized.

It has proved advantageous if the element generating the attenuation pole is formed by a stepped resonator attached to a mechanical transmission line (coupling line), or if the element generating the attenuation pole is formed by a mechanical coupling member.

In the following the invention will be explained in more detail with the aid of examples of construction illustrated in the drawings, in which.

Figure 1:
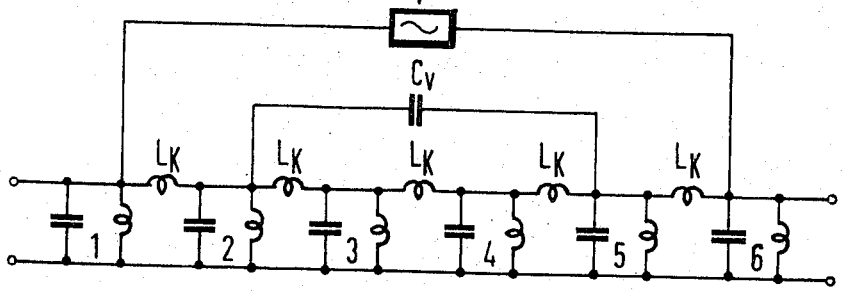
FIG. 1 is an electrical equivalent circuit diagram of a mechanical filter embodying the invention.

For a better understanding, the concept of the invention is first illustrated with the aid of electrical equivalent circuit diagrams. In the invention there is taken as a starting point the teaching that pole generating electromechanical filters can, in analysis, be reduced with respect to their manner of operation, to an electrical equivalent circuit diagram in which one or more resonance circuits are bridged by a reactance. Correspondingly, in FIG. 1 there is represented an electrical equivalent circuit diagram of a mechanical filter, in which six parallel resonance circuits 1 to 6 are coupled over the coupling inductances $L_k$. The resonance circuits 2 and 5 are additionally coupled with one another through a coupling capacitance $C_v$, so that the resonance circuits 3 and 4 and the coupling inductances lying therebetween are bridged by the capacitance $C_v$. Through the bridging $C_v$ there results a filter which has an attenuation pole above and below the pass range. According to the invention, such a filter is additionally bridged by a further reactance $X_v$, so that the bridging includes at least one of the resonators adjacent to the element generating the attenuation pole and its coupling to the next following resonator. The action of the additional bridging $X_v$ is explained in further detail with the aid of FIGS. 2–7.

Figure 2:
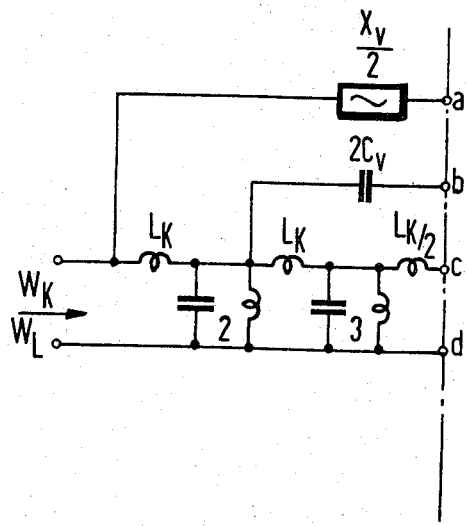
FIG. 2 is an electrical equivalent circuit diagram of a half member formed by dividing the circuit of FIG. 1 in half.
Figure 3:
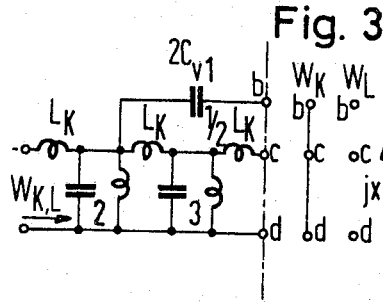
FIGS. 3-5 illustrate half members similar to FIG. 2, together with respective graphs representing the input open-circuit and input short-circuit impedances.
Figure 3:
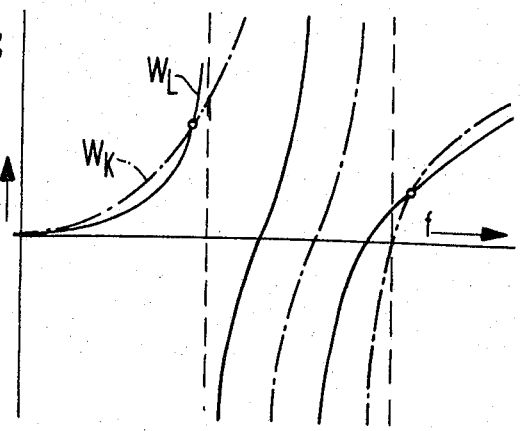

The filter can be resolved, according to FIG. 2, along the dot-dash dividing line into two mirror-symmetrical half members. Since the resonance circuits 1 and 6 do not contribute to the generation of attenuation poles, the one end circuit (circuit 1) is not illustrated in the half member of FIG. 2. In the resolution analysis with the half member, moreover, the circuit elements adjacent to the symmetry line, indicated in dot and dash, take on half the reactance value, so that the coupling inductance has the value $L_k/2$, the bridging capacitance the value $2 C_v$, and the additional bridging reactance the value $X_v/2$. The terminals arising on the symmetry line are designated as $a$, $b$, $c$, $d$. As is well known, in a circuit according to FIG. 1, attenuation poles occur at the frequencies at which the input short-circuit impedance $W_k$ and the input open-circuit impedance $W_l$ of the half member according to FIG. 2 are equal. In FIG. 3 there is initially plotted the theoretical course of $W_k$ and $W_l$ in dependence on the frequency $f$ for the known case, namely, that only one capacitive over-coupling $k_{25}$ is present from circuit 2 to circuit 5.

Figure 4:
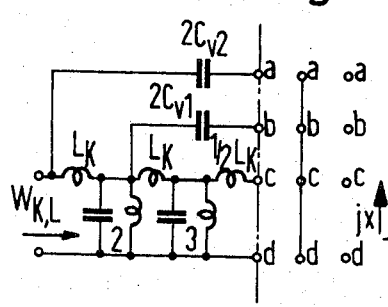
Figure 4:
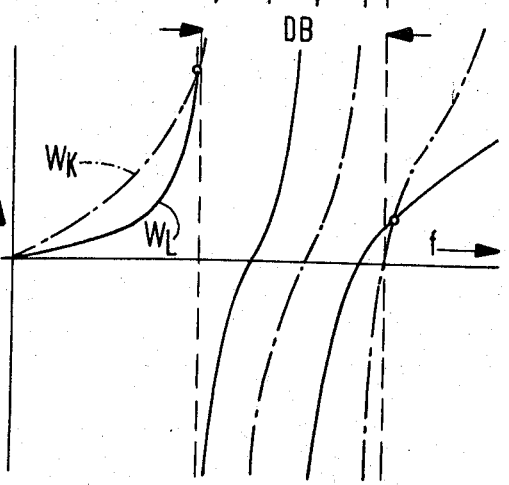

The input open-circuit impedance $W_l$ is indicated by the solid lines and the input short-circuit impedance $W_k$ is indicated by the dot and dash lines. The pass range of the filter lies in the frequency range in which $W_k$ and $W_l$ have opposite signs. Attenuation poles in the blocking range arise at the inter points of $W_k$ and $W_l$ and therefore one pole arises in the lower blocking range, and one pole in the upper blocking range. There is additionally illustrated in the circuit, the terminal connections for the examination of the short-circuit and of the open-circuit impedance conditions, that is, in the examination of $W_k$ the terminals $b$, $c$ and $d$ have to be short-circuited and in the examination of $W_l$ the terminals $b$, $c$ and $d$ have to be open. In FIG. 4 there is observed the effect of the over-coupling $k_{16}$, according to the invention from circuit 1 to circuit 6, if it is capacitive like $k_{25}$. In the examination of the input short-circuit impedance, the terminals $a$, $b$, $c$ and $d$ have to be short-circuited, and in the examination of the input open-circuit impedance the terminals $a$, $b$, $c$, $d$ must be open. For greater clarity the curves for the input short-circuit and input open-circuit impedance are drawn under one another, so that the pass ranges lie one below the other. As is to be seen from the curve of FIG. 4, there again result, two attenuation poles which, however, lie closer to the pass range than the poles obtained with the simple over-coupling $k_{25}$. Thereby, through an additional capacitance over coupling which includes the attenuation-pole-generating element and its coupling, the attenuation poles can be shifted in the direction of the pass range.

Figure 5:
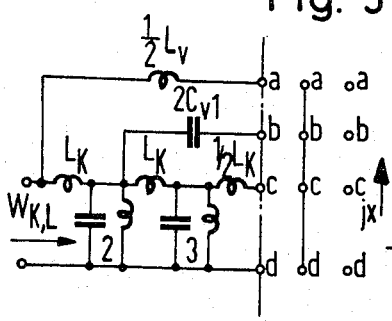
Figure 5:
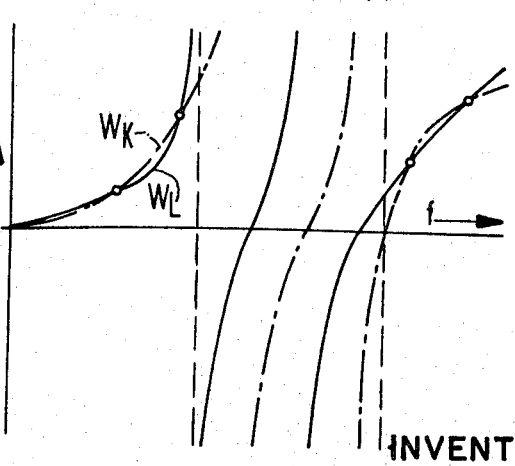

In the half-member illustrated in FIG. 5, the additional over-coupling $k_{16}$ is realized by an inductance $L_v$ (in the half-member, therefore, $L_v/2$). The curves for $W_k$ and $W_l$ are again plotted and directly under the curves of FIG. 4 and, as apparent from the curves, in each case one pole pair lies above and one below the pass range. Upon an increase of this inductive over-coupling the two poles of each pole pair move closer and closer together. In the extreme case each two poles lie at the same frequency. Upon a further increase of the over-coupling there result attenuation poles at complex frequencies, which can be utilized, for example, for the construction of running time influencing members. As noted from FIG. 5, through the additional inductively-acting bridging there arises an additional pole on both sides of the blocking range.

The additional inductive bridging for the generation, or for the shifting of attenuation poles can with good approximation be replaced by a capacitive bridging, simpler in many cases, if the filter circuit is supplemented by an ideal transformer with the translation ratio $1:-1$. Such a transformer in mechanical filters can generally be provided as will be subsequently explained, by a corresponding provision of a coupling element or by a corresponding polarization of an end vibrator provided with electrostrictively acting transducing elements.

In the above described cases, each additional over-coupling bridges an even number of oscillatory circuits. The attenuation poles there formed thus are always in pairs and, in their frequency position, approximately symmetrically to the pass range. In the additional bridging is generated by a mechanical line, it is possible, in dependance on the phase of the bridging line, to also select the pole frequencies asymmetrically to the pass range.

Figure 6:
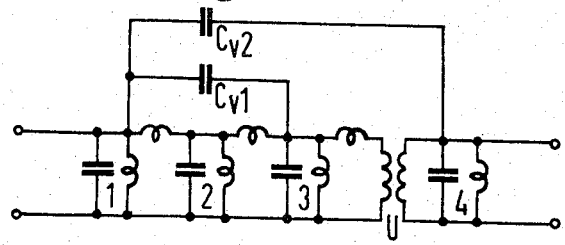
FIG. 6 illustrates a further equivalent circuit diagram.
Figure 7:
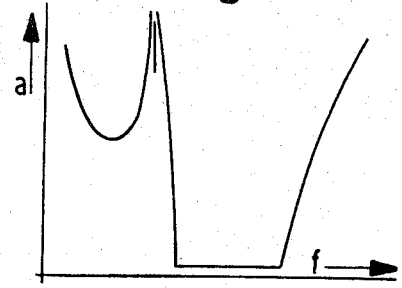
FIGS. 7-9 are graphs illustrating respective attenuation characteristic curves.

In the equivalent circuit diagram of FIG. 6 there is illustrated a branch circuit which consists of four parallel resonance circuits 1, 2, 3 and 4 disposed in the cross branch of the circuit. The individual resonance circuits are coupled with one another over coupling inductances in the longitudinal branch, and at the output side of resonance circuit 3 there is inserted a transformer U, on the secondary side of which there is disposed the resonance circuit 4. The resonance circuit 2 and its coupling inductances are bridged by a capacitance $C_{v1}$ which extends from the resonance circuit 1 to the resonance circuit 3. With such a circuit there results an attenuation characteristic curve as illustrated in FIG. 7, in which the operating attenuation $a_b$ is plotted in dependence upon the frequency $f$. As apparent from FIG. 7, a one-sided steepening of the attenuation characteristic curve is achieved.

Figure 8:
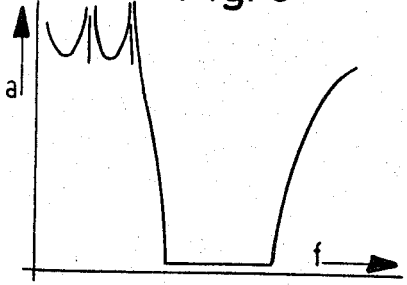
Figure 9:
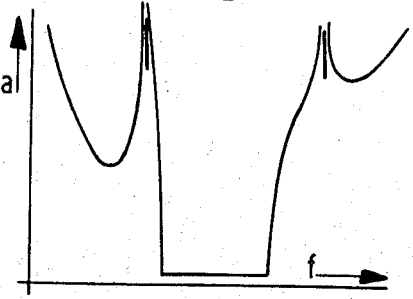

FIGS. 8 and 9 illustrate the attenuation curves when an additional over-coupling is introduced from circuit 1 to circuit 4, which is realized in the equivalent circuit diagram of FIG. 6 by a capacitance $C_{v2}$. If the transformer U has a transformation ratio $1:-1$, there results from the additional coupling bridge $C_{v2}$, in the lower blocking range, an additional attenuation pole, with the original attenuation pole being moved away from the pass range, which attenuation course is illustrated in FIG. 8. FIG. 9 illustrates the attenuation course when the over-coupling from circuit 1 to circuit 4 is in like phase, that is, when the transformer U has a transformation ratio $1:+1$. Through this arrangement there likewise arises an additional attenuation pole which lies in the upper blocking range and simultaneously the pole frequency, in the lower blocking range, is moved nearer to the pass range as compared to the position illustrated in FIG. 7. The resulting attenuation poles thus no longer lie symmetrically to the pass range.

The number of coupling bridges can also be greater than the two bridges illustrated in FIGS. 1 to 6. In the case of a triple bridging there can occur up to three attenuation poles, each in the lower and in the upper blocking range if each of the three over-couplings bridges an even number of resonators.

In the subsequent figures there are illustrated additional examples of construction of mechanical filters whose electrical equivalent circuit diagrams relate back to FIGS. 1 to 6.

Figure 10:
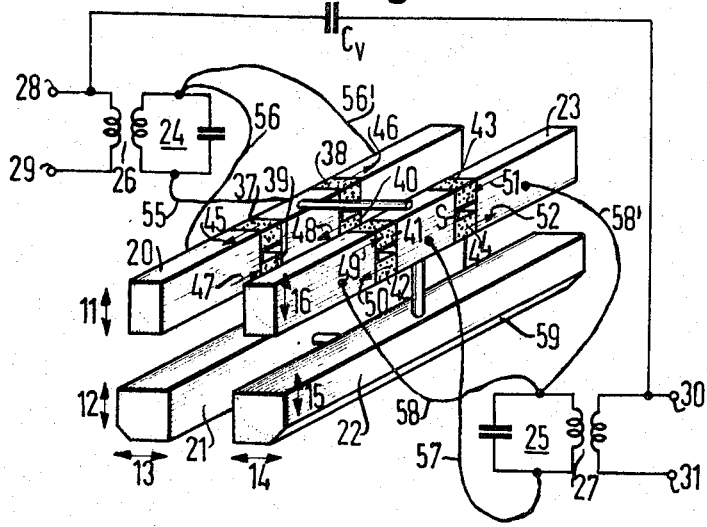
FIG. 10 illustrates an example of mechanical filter embodying the invention.

FIG. 10 illustrates an example of construction of a band filter which comprises four mechanical resonators 20, 21, 22 and 23 coupled with one another and whose terminal circuits 24 and 25 are constructed with concentrated circuit elements. The coils of the parallel resonance circuits 24 and 25 form a part of the respective transformers 26 and 27, whose input and output terminals are respectively designated by the reference numbers 28, 29, 30 and 31.

Figure 11:
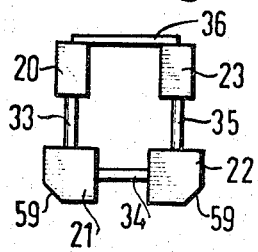
FIG. 11 is an end elevational view of the mechanical filter elements illustrated in FIG. 10.

An end elevational view of the mechanical portion of the filter is separately illustrated in FIG. 11 and it will be noted that the individual resonators are coupled with one another over coupling elements 33, 34 and 35 constructed as coupling rods having a circular cross section. An additional coupling rod 36 (see FIG. 10) is attached to the resonators 20 and 23. In the body of the resonator 20 there are disposed blocks 37 to 40 consisting of an electrostrictive material. It will be assumed that the individual resonators consist of steel and that the electrostrictive blocks are provided on the sides facing the steel parts with an electrically conducting layer and are thereby connectable, by soldering with the steel parts. The resonator 23 is constructed in like manner, in which the blocks 49, 50, 51 and 52 consisting of electrostrictive material are mounted. Between the individual blocks there is provided a continuous free space or gap S. Since the resonators, as will be subsequently explained, operate as bending vibrators, the gap S lies in the plane of the neutral fiber, meaning by the term "neutral fiber," the plane in which the bending forces reverse their sign.

Impressed on the electrostrictively active blocks 37 to 40, by preliminary direct-voltage treatment, is a pre-polarization acting in the direction of the arrows 45 to 48. The electrostrivtively active blocks 41 to 44 likewise are provided with a pre-polarization in the direction of the arrows 49 to 52. As is apparent from the figure, the pre-polarization is so selected that in each case two blocks lying in the longitudinal direction of the vibrator are oppositely polarized, and that simultaneously the blocks lying above the neutral fiber are polarized oppositely to the blocks lying below the neutral fiber. The middle portion of the resonator 20 is connected by a feed wire 55 with the one end of the parallel resonance circuit 24, while the two outer parts of the resonator 20 are electrically conductively connected by the feed wires 56 and 56′ with the other end of the resonance circuit 24. In like manner, the middle portion of the resonator 23 is connected by the wire 57 with the one end of the resonance circuit 25, while the feed wires 58 and 58′ connect the other end of the resonance circuit 25 with the outer parts of the resonator 23. If an alternating potential is applied to the terminals 28 and 29 there also lies on the parallel resonance circuit 24, at its resonance frequency, an alternating potential corresponding to the transformation ratio of the transformer 26. This alternating potential generates in the electrostrictive blocks 37 to 40 an electric field through which, for example, the blocks 37 and 38 are expanded in the one half cycle of the electrical alternating potential, and simultaneously the blocks 39 and 40 contract, since their polarization, corresponding to the arrows 47 and 48, is directly oppositely to the polarization of the blocks 37 and 38. In the next half cycle of the electrical alternating potential such process is reversed. In this manner forces are exerted on the resonator 20 and excite it, in its bending frequency, to bending vibrations in the direction of the double arrow 11. As a result of the gaps S, lying in the plane of the neutral fiber, the excitation of troublesome side waves is largely avoided, since the electrostrictively active systems can move freely in this plane. The bending vibrations excited in resonator 20 are transferred over the coupling rod 33, arranged in the zone of maximum oscillation (antinode) to the resonator 21, which thereby executes bending vibrations in the direction of the double arrow. The resonators 21 and 22 have essentially a square cross section and are each provided along one longitudinal edge with a flattened portion 59, through which flattened portions the symmetry of the resonators 21 and 22 is disturbed and over such disturbance there is excited a bending vibration running in the direction of the double arrow 23. The portion 59 acts, therefore, as a coupling element for the coupling of the two bending vibrations 12 and 13 standing perpendicular to one another. The bending vibration running in the direction of the double arrow 13 is transmitted from the resonator 21, over the coupling rod 34, to the resonator 22 and there excites a bending vibration running in the direction of the double arrow 14. Likewise, over the flattened portion 59 provided on the resonator 22 a bending vibration is excited running in the direction of the double arrow 15, which stands perpendicular to the bending vibration running in the direction of the double arrow 14. The coupling rod 35 transmits the bending vibration 15 to the resonator 23, so that the latter executes bending vibrations in the direction of the double arrow 16. By reason of the bending vibration 16 of resonator 23, the electrostrictive blocks 41 to 44 are subjected to expansions and contractions, so that, in a reverse manner to the vibration excitation of resonator 20, between the middle part and the two outer parts of reconator 23 there arises an electrical alternating potential which is fed over the feed wires 57 and 58 or 58′ to the parallel resonance circuit 25. The alternating potential lying on the parallel resonance circuit 25 is transmitted, over the output transformer 27, to the terminals 30 and 31 and can there be taken off as an output alternating potential.

From the above explanation it is also evident that the resonators 20 and 23 operate simultaneously as electrostrictively acting electromechanical transducers. It should be noted that the parallel resonance circuits 24 and 25 are tuned at least approximately to the same frequency, which also simultaneously coincides with the inherent bending frequency of the mechanical resonators 20 to 23. Because of the essentially square cross section of resonators 21 and 22, the inherent bending frequencies of the bending vibrations running in direction 12 and 13 and in direction 14 and 15 fall at least approximately at the same frequency. The resonators 21 and 22 are thereby doubly utilized, so that the effect of the portion of the filter consisting of four mechanical resonators corresponds, in effect, to a six-circuit band filter. In the coupling of the bending vibration, the coupling rods 33, 34 and 35 are operative essentially in a push and pull manner, that is, they act as so-called longitudinal couplers.

For the generation of attenuation poles there is provided a coupling rod 36 attached to the resonators 20 and 23 in the zones of respective antinodes, which couples together the bending vibrations running in the direction of the double arrows 11 and 16, and in which system the bending vibrations running in the direction of the double arrows 12, 13, 14 and 15 simultaneously are skipped. Since the coupling rod 36 bridges an even number of vibrators, there initially arises thereby two attenuation poles, of which the one lies below and the other above the filter pass range. The mechanical part of the filter thus can be traced back, substantially to an equivalent circuit diagram corresponding to FIG. 1 or its half member according to FIG. 2, if the additional bridging reactance is omitted from consideration. For the generation of two further attenuation poles the input and the output of the filter may be bridged by an additional capacitance $C_c$, whereby there results, substantially, the manner of operation explained with respect to the half member of FIG. 5.

Figure 12:
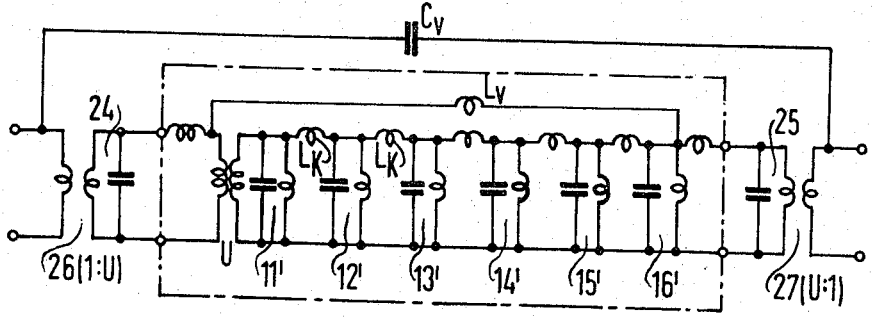
FIG. 12 is an electrical equivalent circuit diagram of the filter illustrated in FIGS. 10 and 11.

In FIG. 12 there is illustrated an electrical equivalent circuit diagram of the filter represented in FIG. 11. The parallel resonance circuits 11′ to 16′ there correspond to the bending vibrations of the mechanical resonators characterized by the double arrows 11 to 16. The coupling inductances $L_k$ lying in the longitudinal branch correspond to the coupling over the coupling elements 33, 34 and 35, respectively, and the flattened portions 59. Since the polarization of the blocks 41 to 44, indicated by the arrows 49 to 52, is selected oppositely to the polarization of the blocks 37 to 40, the alternating voltage resulting at the resonator 23 is in counterphase to the alternating voltage lying on the resonator 20. This counterphase condition is taken into consideration in the equivalent circuit diagram by a transformer U, which has a transformation ratio 1: —1. The additional coupling generating the first two attenuation poles between the bending vibrations 11 and 16 over the coupling rod 36 is taken into account by the bridging inductance $L_v$ which is connected to the primary side of the transformer U and the resonance circuit 16'. The mechanical part of the filter is framed by the dot-and-dash line. The parallel resonance circuits 24 and 25 consisting of concentrated circuit elements, following the mechanical portion, as well as the transformers 26 and 27 with the translation ratio 1:$u$ and $u$:1, respectively, also appear in the equivalent circuit diagram. Additionally, the filter input and filter output aer bridged by the bridging capacitance $C_v$ through which, in the manner previously described, two further attenuation poles are generated.

Figure 13:
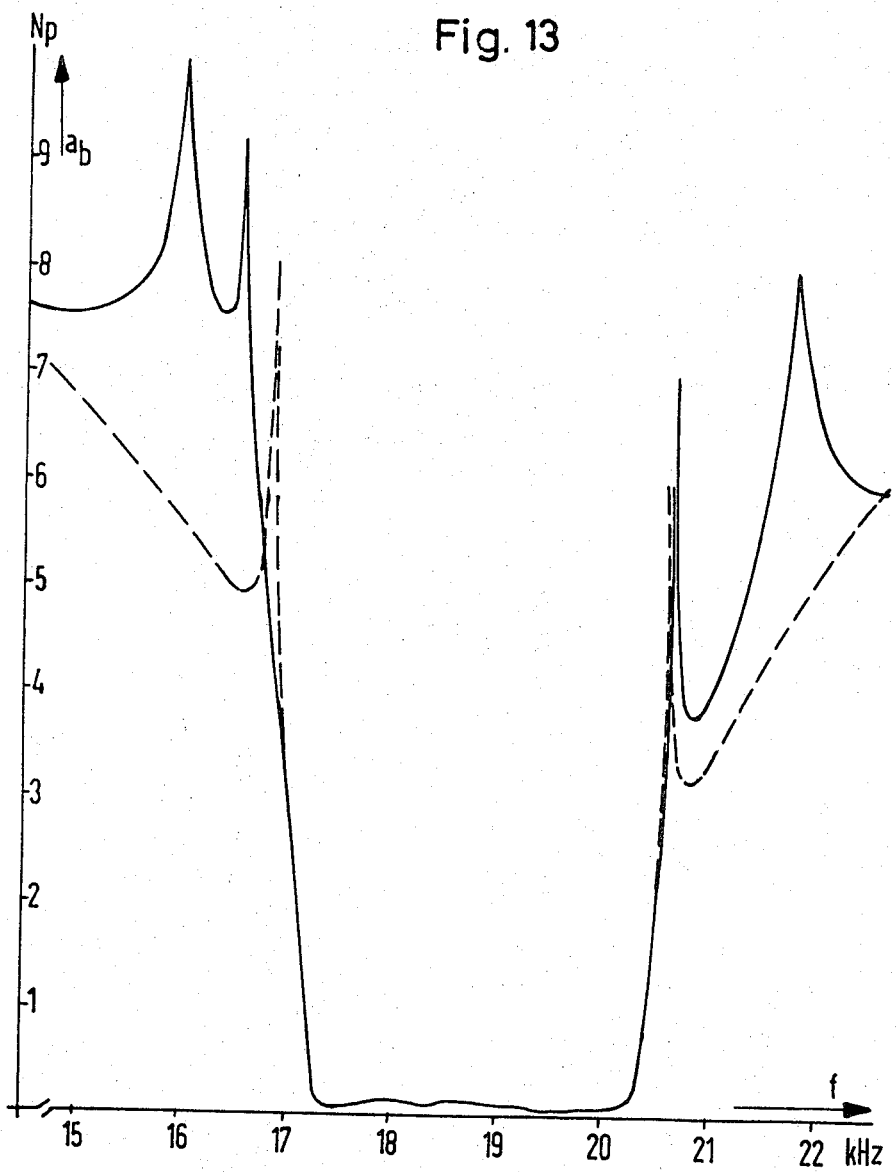
FIG. 13 is a graph illustrating the attenuation characteristics of the filter according to FIG. 12.

In FIG. 13 the operating attenuation $a_b$ is represented in nepers, in dependence on the frequency $f$ of a filter constructed according to FIG. 12, the pass range of which lies about between 17.5 and 20.2 kc. The curve in broken lines represents the attenuation course without the additional capacitance $C_v$ and the solid-line curve represents the attenuation course when filter input and filter output are connected over the additional capacitance $C_v$. As will be seen from the attenuation curves, two further attenuation poles result, in which system the attenuation poles adjacent to the filter pass range are displaced with respect to their position in the absence of the capacitance $C_v$. Additionally, the blocking attenuations, as a whole, are further increased.

If in the example of construction illustrated in FIG. 10 the polarization of the electrostrictive blocks 41 to 44 is so selected that it is in the same direction as the polarization of the electrostrictive blocks 37 to 40, that is, therefore, that the voltage arising at the resonator 23 is in like phase with the voltage lying on the resonator 20, there results in the portion of the equivalent circuit diagram of FIG. 12, a transformer U disposed in the mechanical portion, which has a transformation ratio 1:+1. Such a transformer can be omitted from consideration, so that in the equivalent circuit diagram of FIG. 12, the connecting lines can be continuously drawn. As previously mentioned, in this case the bridging reactance $L_v$ must be replaced by a capacitance. Since, simultaneously, the reactance bridging the whole filter is also formed by the capacitance $C_v$, there do not result, corresponding to the half member of FIG. 4, any additional attenuation poles, but merely the attenuation poles already present, through the coupling rod 36 are moved closer to the pass range of the filter.

Figure 14:
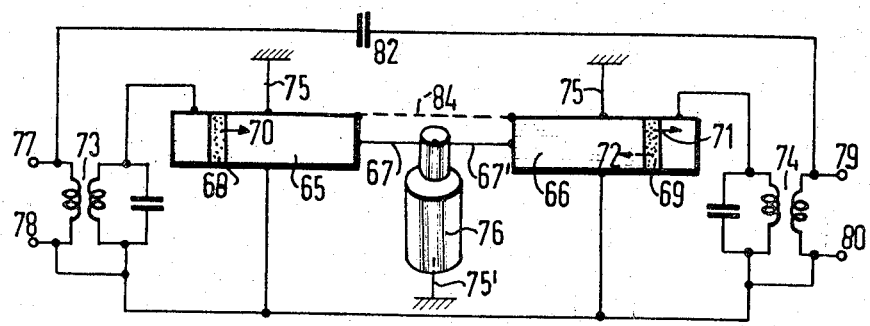
FIG. 14 illustrates another example of a mechanical filter embodying the invention.

In FIG. 14 an example of construction is illustrated in which two mechanical resonators 65 and 66 consisting of steel are coupled over two sections 67 and 67' of a mechanical coupling line. The resonators 65 and 66 are anchored at their vibration nodes in a casing (not represented) by the retaining wires 75. In the resonators 65 and 66 there are disposed, in the known manner, electrostrictively active blocks 68 and 69. On the blocks 68 and 69 there is impressed by a preliminary direct-voltage treatment, a polarization in the direction of the arrows 70 and 71. Attached to the coupling line 67, 67' is a further resonator 76 which is constructed in the form of a so-called step vibrator and which is anchored in the casing over a retaining wire 75' extending in the direction of its central axis. Such a step-vibrator acts, in its electrical equivalent circuit diagram, like a pole-generating circuit, for example like a parallel resonance circuit to the input side of which there is connected a reactance. Depending on the sign of the inserted reactance, that is, according to whether the reactance is capacitive or inductive, there results an attenuation pole below or above the pass range. The size of this reactance can be governed by the length and the diameter ratios of the two sections of the resonator 76. An alternating potential lying on the terminals 77 and 78 is transmitted over the input transformer 73 to the two sections of the resonator 65 and generates in the electrostrictive block 68 an electrical alternating field, whereby the resonator 65 is excited at its particular frequency to vibrations in its longitudinal direction (longitudinal vibrations). These longitudinal vibrations are transmitted over the coupling line 67 to the resonator 76, which, because of the fastening of the coupling line to its circumference, executes torsional vibrations. Through the torsional vibrations of the resonator 76 the coupling line 67' also is excited in longitudinal vibrations, which are transmitted to the resonator 66 and likewise excite the same into longitudinal vibrations. Because of the longitudinal vibrations of the resonator 66, the electrostrictive block 69 is expanded and contracted, so that between the two sections of the resonator 66 there results an electrical alternating potential which can be obtained over the output circuit 74 at the terminals 79 and 80, as an output alternating voltage. The precise manner of operation of resonators which are constructed as step vibrators is subsequently explained in greater detail with the aid of FIGS. 19, 20 and 21.

Figure 16:
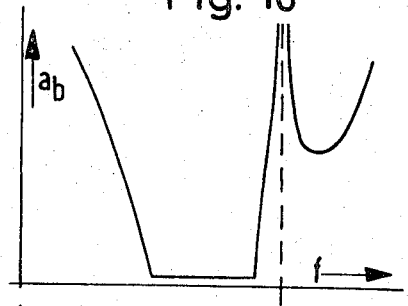
FIGS. 16-18 are graphs illustrating respective attenuation characteristic curves for filters of the type illustrated in FIGS. 14 and 15.
Figure 17:
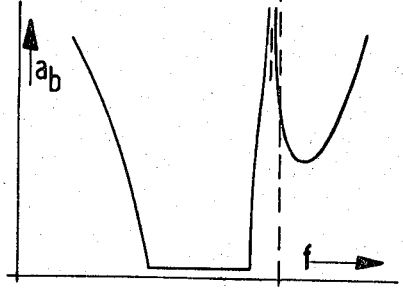

For the shifting of the attenuation pole already present, or for the generation of two new attenuation poles there is provided a reactance which connects the electrical output and input circuits. This reactance in the example of execution of FIG. 14 is constructed as a capacitor 82 and depending upon its size produces a shifting of the already present attenuation pole in a direction closer to the pass range. Figs. 16 and 17 illustrate the appertaining attenuation course.—FIG. 16 illustrates the attenuation characteristic curve without the addiional bridging of the filter by a reactance. In FIG. 17 there is illustrated the attenuation course when the bridging reactance is constructed as a capacitor. As is apparent from FIG. 17, the attenuation flank lying above the pass range is more strongly steepened, that is, the attenuation pole is moved close to the pass range of the filter.

Figure 18:
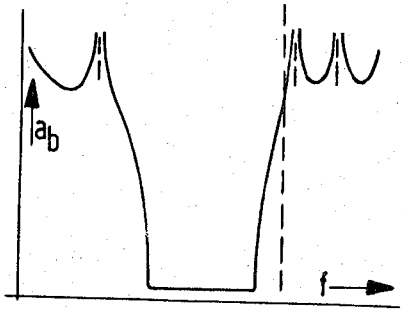

For the generation of two additional attenuation poles, the capacitor 82 can be replaced by an inductance. It is recommended, however, that the inductance be achieved through a capacitor and an oppositely-phased voltage transformation. This opposite-phase voltage transformation can be achieved either through rotation of the polarization direction of the electrostrictive block 69 in the resonator 66, in the direction of arrow 72, or it can also be achieved by corresponding selection of the translation ratio either of the input circuit 73 or of the output circuit 74. Thus there can be given to one of the two transformers the transformation ratio 1:—$u$, if, for example, both transformers previously had a translation ratio 1:+$u$. In FIG. 18 the attenuation diagram corresponding to this condition is presented and, in FIGS. 16, 17 and 18 the pass ranges are illustrated directly under one another, and the original position of the attenuation pole generated by the step vibrator is indicated by the continuously extending broken line. As can be seen in FIG. 18, through the inductively acting additional bridging the attenuation pole already present is moved away somewhat from the filter pass range and, in addition, there result two new attenuation poles, of which the one lies below and the other above the filter pass range.

Instead of the electrical bridging there can also be used a mechanical bridging such as is indicated in FIG. 14 by the broken line 84. Such a mechanical bridging can be realized in the form of a coupling element which directly connects the two resonators 65 and 66, that is, without interposition of the resonator 76. Through the additional mechanical bridging, in the example illustrated in FIG. 14, the already present attenuation pole is moved closer to the filter pass range, so that there results an attenuation course corresponding to FIG. 17. In this case, therefore, the additional coupling line 84 acts as a capacitive reactance, since it connects sections of the resonators, vibrating in like phase, which are immediately adjacent to the pole-generating resonator.

Figure 15:
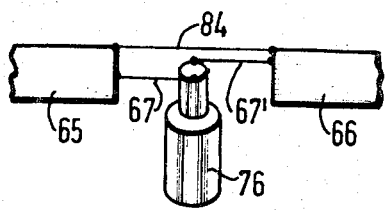
FIG. 15 illustrates a portion of the arrangement of FIG. 14 with modified connections.

In FIG. 15 there is pictured a section of the example illustrated in FIG. 14 with mechanical bridging, in which through a phase reversal two further attenuation poles are generated, of which one lies below and the other above the filter pass range. The attenuation pole already generated by the resonator 76 is moved somewhat away from the pass range, so that there results an attenuation diagram corresponding to FIG. 18. The phase reversal can be achieved in the manner that the coupling elements 67 and 67' do not lie in one plane, but are attached to oppositely situated generatrix lines of the resonator 76.

Figure 19:
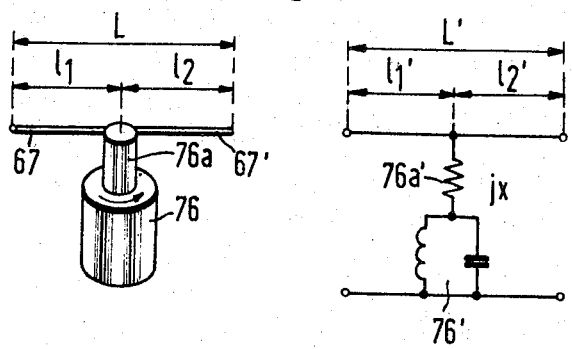
FIG. 19 illustrates the construction of a stepped resonator and the electrical equivalent circuit diagram therefor.
Figure 20:
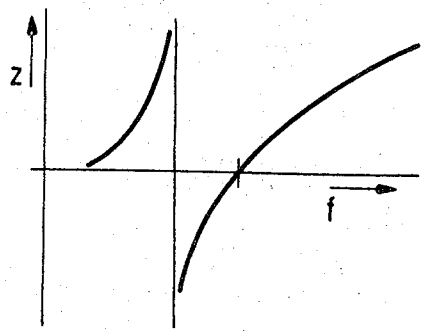
FIGS. 20 and 21 are graphs illustrating the frequency characteristics for the structure of FIG. 19, with capacitive and inductive input impedance, respectively.
Figure 21:
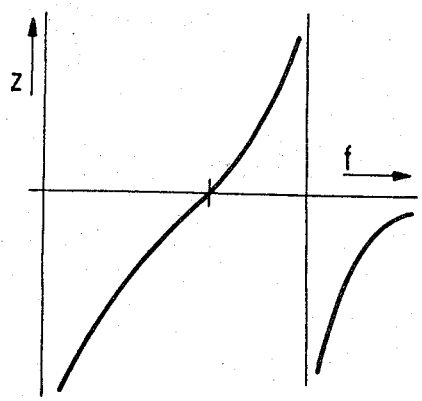

With the aid of FIGS. 19 to 21 there will hereafter be explained in further detail the generation of attenuation poles in the blocking range of the filter by means of so-called step vibrators.

FIG. 19 illustrates a mechanical transmission line 67, 67', which, in the example, has a circular cross section, but which may also have a square cross section or one deviating therefrom. At the end lying to the left in the drawing and at the right in the drawing, the mechanical transmission line 67, 67' is interrupted and the filter parts associated with these line ends (as well as other resonators and the transducers for the transition from electrical vibrations to mechanical vibrations in the mechanical transmission line and, conversely, for the transition from the mechanical vibrations in the mechanical transmission line to the electrical vibrations in the filter output are omitted in the interest of clarity. As transducers there are especially recommended electrostrictive transducers. There results thereby an especially simple filter construction. To the mechanical transmission line 67, 67' there is coupled, over a coupling member 76a, a mechanical resonator 76. The mechanical transmission line has the length L and is subdivided by the coupling piece 76a attached to it into the sections 67 of the length $l_1$ and 67' of the length $l_2$. The length of the resonator 76 is such that, at a pass frequency of given value of the electromechanical filter, it acts at the transition point into the coupling piece 76a as a parallel resonance circuit. The length of the coupling piece 76a is so selected that it acts, not as a resonator, but as a reactance, (capacitance, inductance) lying in series with the resonator 76. If the coupling piece is smaller than $\lambda/4$, it acts inductively; if it is longer, it acts capacitively. Only the length range between 0 and $\lambda/2$ is here considered. The inductive and capacitive behavior is periodically repeated with a lengthening beyond $\lambda/2$. The electrical equivalent circuit diagram for this four-pole is also shown in FIG. 19. It includes a section of an electrical two conductor line, the electrical length L' of which corresponds to the mechanically effective length L of the mechanical transduction line 67, 67'. This line section is bridged at a place corresponding to the mechanical connection point by the series circuit of the reactance $jX$ with a parallel resonance circuit 76'. For a better understanding of the analogy, the magnitudes occurring in the mechanical filter section are designated alike in the electrical equivalent circuit diagram and distinguished merely by respective prime designators.

The operation of this circuit can be pictured as follows. The series circuit of the coupling piece 76a with the resonator 76 yields in itself, according to the nature of the reactance $jX$, that is, according to whether it is inductive or capacitive, a series resonance in addition such series resonance lies, as to frequency, below the parallel resonance of 76' if $jX$ or the mechanically effective length of 76a is capacitive. The series resonance lies above the parallel resonance of 76 or 76' if $jX$ or 76a is inductive. The frequency spacing between the parallel resonance and the series resonance may be adjusted both through dimensioning of the reactance $jX$ or the corresponding dimensioning of the coupling piece 76a, and also through selection of reactance values of the parallel resonance circuit 76' or the corresponding dimensions of the resonator 76. While the parallel resonance affect the mechanical transmission line in such a way that a matching point results in the pass range of the band filter, the series resonance causes an attenuation pole (high transmission attenuation) in the transmission characteristic curve of the filter, because, at the series resonance frequency, it practically short-circuits the mechanical transmission line 67, 67'. It accordingly is possible, for given requirements, to place this attenuation pole in the blocking range of the electromechanical band filter without disturbing the proportioning in the pass range of the filter. Further, it is particularly important that the attenuation pole can be varied at will as to frequency, that is, can be placed as to frequency both above and also below the pass frequency range. The corresponding frequency characteristics at the connecting point of the coupling piece 76a to the transmission line 67, 67' for a transformed input impedance Z of the series circuit 76a, 76 are shown in FIGS. 20 and 21, namely, in FIG. 20 where $jX$ is inductive and in FIG. 21 where $jX$ is capacitive.

Changes may be made within the scope and spirit of the appended claims which define what is believed to be new and desired to have protected by Letters Patent.

I claim:
1. An electromechanical band filter comprising several mechanically coupled resonators, at least the end resonators of which are provided with electromechanical transducers for the transition from electrical to mechanical vibrations, said filter containing at least one element generating an attenuation pole in the filter blocking range, and at least one reactance bridging the element generating the attenuation pole, said bridging including at least the couplings of the element generating the attenuation pole to the adjacent resonators.

2. An electromechanical band filter according to claim 1, wherein the bridging includes at least one of the resonators adjacent to the element generating the attenuation pole and its coupling facing away from the pole-generating element.

3. An electromechanical band filter according to claim 1, wherein said bridging reactance comprises a lumped circuit element.

4. An electromechanical band filter according to claim 1, wherein the bridging reactance is formed by a mechanical coupling element.

5. An electromechanical band filter according to claim 1, wherein the element generating the attenuation pole is formed by a stepped resonator attached to a mechanical transmission line.

6. An electromechanical band filter according to claim 1, wherein the element generating the attenuation pole is formed by a mechanical coupling member.

References Cited

UNITED STATES PATENTS

| 2,856,588 | 10/1958 | Barns | 333—71 |
| 3,284,728 | 11/1966 | Poschenrieder | 333—72 |
| 3,287,669 | 11/1966 | Poschenrieder | 333—71 |
| 3,290,621 | 12/1966 | Krambeer et al. | 333—71 |

ROY LAKE, *Primary Examiner.*

DARWIN R. HOSTETTER, *Examiner.*